United States Patent [19]

Sears

[11] Patent Number: 5,625,659
[45] Date of Patent: Apr. 29, 1997

[54] METHOD AND APPARATUS FOR ELECTRONICALLY MEASURING DISPENSER USAGE

[75] Inventor: Lawrence M. Sears, Hunting Valley, Ohio

[73] Assignee: GOJO Industries, Inc., Cuyahoga Falls, Ohio

[21] Appl. No.: 446,026

[22] Filed: May 19, 1995

[51] Int. Cl.⁶ .................................................. G01F 15/00
[52] U.S. Cl. ............................................................ 377/21
[58] Field of Search ........................................ 377/19, 21

[56] References Cited

U.S. PATENT DOCUMENTS

| | | | |
|---|---|---|---|
| 3,119,557 | 1/1964 | Chapman | 235/91 |
| 3,606,084 | 12/1971 | Morrone | 222/38 |
| 4,188,984 | 2/1980 | Lyall | 141/12 |
| 4,265,370 | 5/1981 | Reilly | 222/25 |
| 4,349,133 | 9/1982 | Christine | 222/183 |
| 4,394,938 | 7/1983 | Frassanito | 222/207 |
| 4,621,749 | 11/1986 | Kanfer | 222/153 |
| 4,715,517 | 12/1987 | Potter et al. | 222/181 |
| 4,765,515 | 8/1988 | Lippman | 222/162 |
| 4,774,916 | 10/1988 | Smith | 123/180 |
| 5,370,267 | 12/1994 | Schroeder | 222/1 |
| 5,397,028 | 3/1995 | Jesadanont | 222/1 |

*Primary Examiner*—Margaret Rose Wambach
*Attorney, Agent, or Firm*—Reese Taylor

[57] ABSTRACT

An apparatus and method of counting dispensing events or washes in a fluid dispenser in which an activator is moved from a starting position to a dispensing position and back to dispense material includes a counter which is indexable to record a dispensing event and which can only be indexed again after dispensing pressure is totally relieved from the activator for a predetermined period of time. The counter is activated by a switch carried on the activator that initiates a timer when the activator leaves the dispensing position. The timer is reset if the activator is returned to the dispensing position prior to the predetermined period of time elapsing. Only after elapse of this period of time can the counter be activated again.

13 Claims, 4 Drawing Sheets

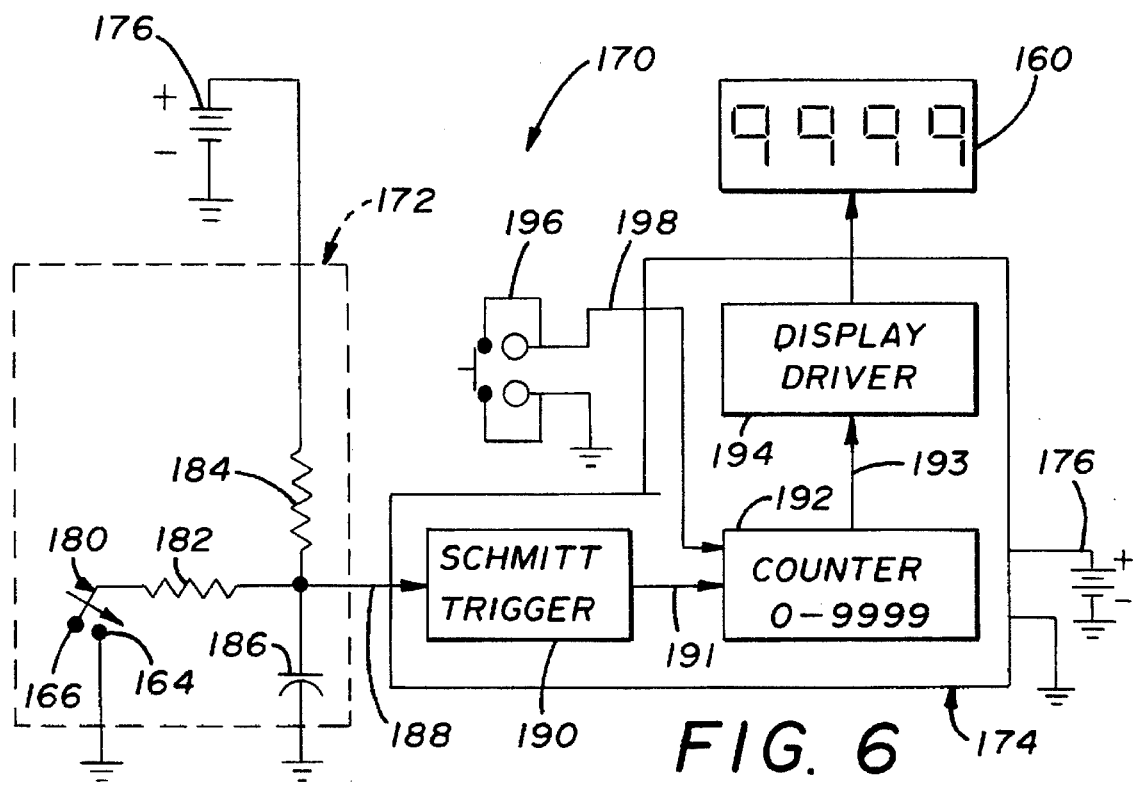
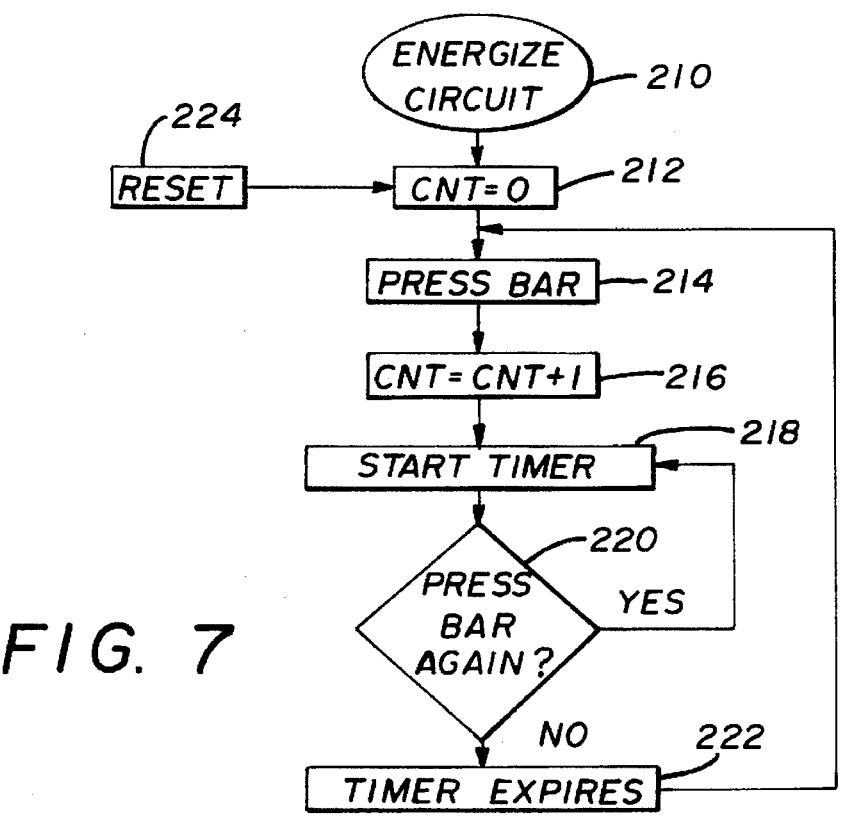

:

METHOD AND APPARATUS FOR ELECTRONICALLY MEASURING DISPENSER USAGE

FIELD OF THE INVENTION

This invention relates in general to fluid dispensing apparatus and relates in particular to a method and apparatus for electronically measuring and recording the number of times the dispenser apparatus is used.

BACKGROUND OF THE INVENTION

There are a number of soap dispensers commercially available some of which are wall mounted and include a base adapted to be mounted against a wall or other vertical surface and a cover. The covers are generally hinged to the mounting base and so as to be capable of swinging to an open position to permit loading into the dispenser and to a closed and locked position for operation. In that regard, the soap is often sold in replaceable containers such as collapsible bags with a dispensing tube extending therefrom and having a dispensing nozzle on the projecting end.

Examples of such dispensers can be seen in Potter U.S. Pat. No. 4,715,517, Lippman U.S. Pat. No. 4,765,515 and Kanfer U.S. Pat. No. 4,621,749. This prior art discloses dispensers in which a push bar is secured either to the cover or to the base member so that upon engagement and actuation of the push bar by the hand of the user the dispensing tube containing the soap is collapsed so as to eject a predetermined portion through the dispensing nozzle at the end of the tube onto the hand of the user.

Another dispenser in this field can be seen in Kanfer U.S. Pat. No. 4,582,227 which discloses a pump type soap dispenser.

There are also a number of various material dispensers available which are configured with a counting apparatus. These counting dispensers provide a numerical indication of the number of times the material dispenser has been activated.

Examples of such dispensers can be seen in Morrone U.S. Pat. No. 3,606,084, Chapman U.S. Pat. No. 3,119,557, Lyall U.S. Pat. No. 4,188,984, Smith U.S. Pat. No. 4,774,916 and Reilly U.S. Pat. No. 4,265,370. This prior art discloses various material dispensers in which a counter mechanism is communicative with an activator so that upon engagement thereof, the counter records that actuation.

All of the aforementioned soap dispensers are commonly located and used in many different environments. Particularly, however, they are often used in a hospital or restaurant setting wherein sanitation is of prime importance.

Various regulatory bodies have determined through experience that on average these sanitary requirements can be met if a predetermined number of hand washings per employee occur during a predetermined period of time such as an hour, a shift, etc. Thus, for example, if two parties are involved and the desired number of hand washings on average is ten per hour, the total number of hand washes involving the particular dispenser in an hour would be twenty.

The difficulty involved in measuring compliance with these various regulations and aspirational goals is that the user will often "pump" the dispenser. In other words, the user will often engage the push bar with his or her hand and depress it partially or fully and then maintain hand contact and repeat the depression movement several times. Therefore, if one is to simply measure the number of times that the pressure bar or push bar moves, one would record a number of hand washings in such an instance that would be, in fact, inaccurate.

An example of a dispenser that measures the actual number of dispensing events is seen in Schroeder U.S. Pat. No. 5,370,267. This dispenser records a dispensing event only after a resilient member, which is depressed by an activator, returns to its original state. Unfortunately, the resiliency of the resilient member changes appreciably after extended use. As such, the variation in the return time of the resilient member may result in multiple dispensing events only being counted as one dispensing event.

Therefore, it has become apparent that it is desirable to increment a counter with a consistent and repeatable predetermined delay time, prior to the next actuation of the counter, so that multiple dispensing events are not classified as a single dispensing event.

SUMMARY OF THE INVENTION

It has been found, therefore, that a measuring apparatus can be constructed which can be either removably or permanently inserted into a conventional dispensing unit of the type generally described above with a counter and means for delaying the next actuation of the counter until the push bar or pressure member has been released for a predetermined period of time subsequent to a series of compression motions. For example, in the push bar type dispenser illustrated herein, the counter desirably will only register an additional "wash" when the push bar has been relieved of dispensing pressure and returned to a static position for a predetermined period after the stroke is completed.

Specifically, it has been found that the counter can be incremented by a switch which is electrically operative with an electrical circuit that operates a numerical display. The switch is positioned so as to be engaged by the push bar or pressure bar of the dispenser. The switch acts on a time delay circuit so that when the switch is disengaged, such as by releasing the push bar, a timer is activated. Once the timer has completely elapsed, the counter is ready to be indexed to measure another "washing" or dispensing event.

It has been found that due to the predetermined time period of the time delay circuit, if the user maintains contact with the push bar or pressure bar and "pumps" rapid strokes thereof, the timer is continually reset until the preselected time period has completely elapsed. Therefore, the counter can not register another wash until the push bar has been released for the predetermined period of time.

Accordingly, production of a method and apparatus for electronically measuring usage of a fluid dispenser of the character above described becomes the principal object of this invention with other objects thereof becoming more apparent upon a reading of the following brief specification considered and interpreted in view of the accompanying drawings.

BRIEF DESCRIPTION OF THE DRAWINGS

FIG. 6 is a block circuit diagram of the measuring apparatus.

FIG. 7 is a top level flow chart illustrating the operation of the measuring apparatus.

BRIEF DESCRIPTION OF THE PREFERRED EMBODIMENTS

Figure 1:
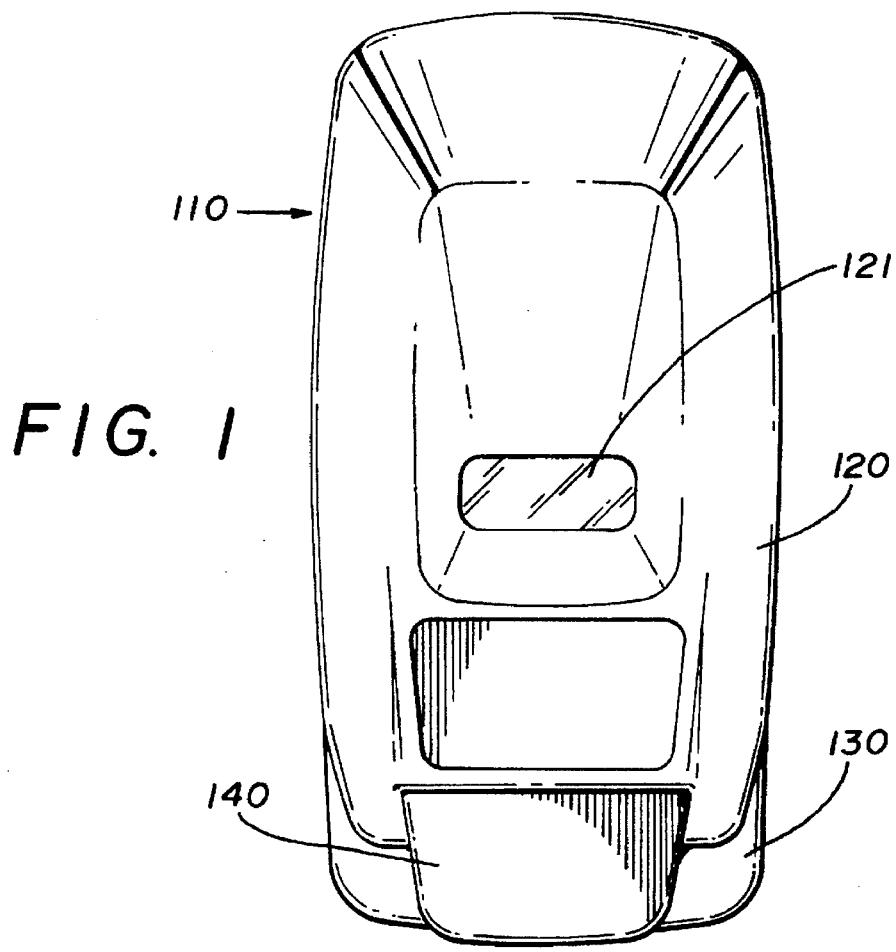
FIG. 1 is a front elevational view of a typical dispenser.

Referring first then to FIG. 1 of the drawings, it will be seen that the dispenser, generally indicated by the numeral 110, includes a cover 120 and a base plate or wall mounting plate 130. Also carried on the cover 120 is a push bar or pressure bar 140. It will be appreciated that the cover 120 has a view window 121 such that the operator of the dispenser 110 may easily ascertain the quantity of material retained within the dispenser 110.

Figure 2:
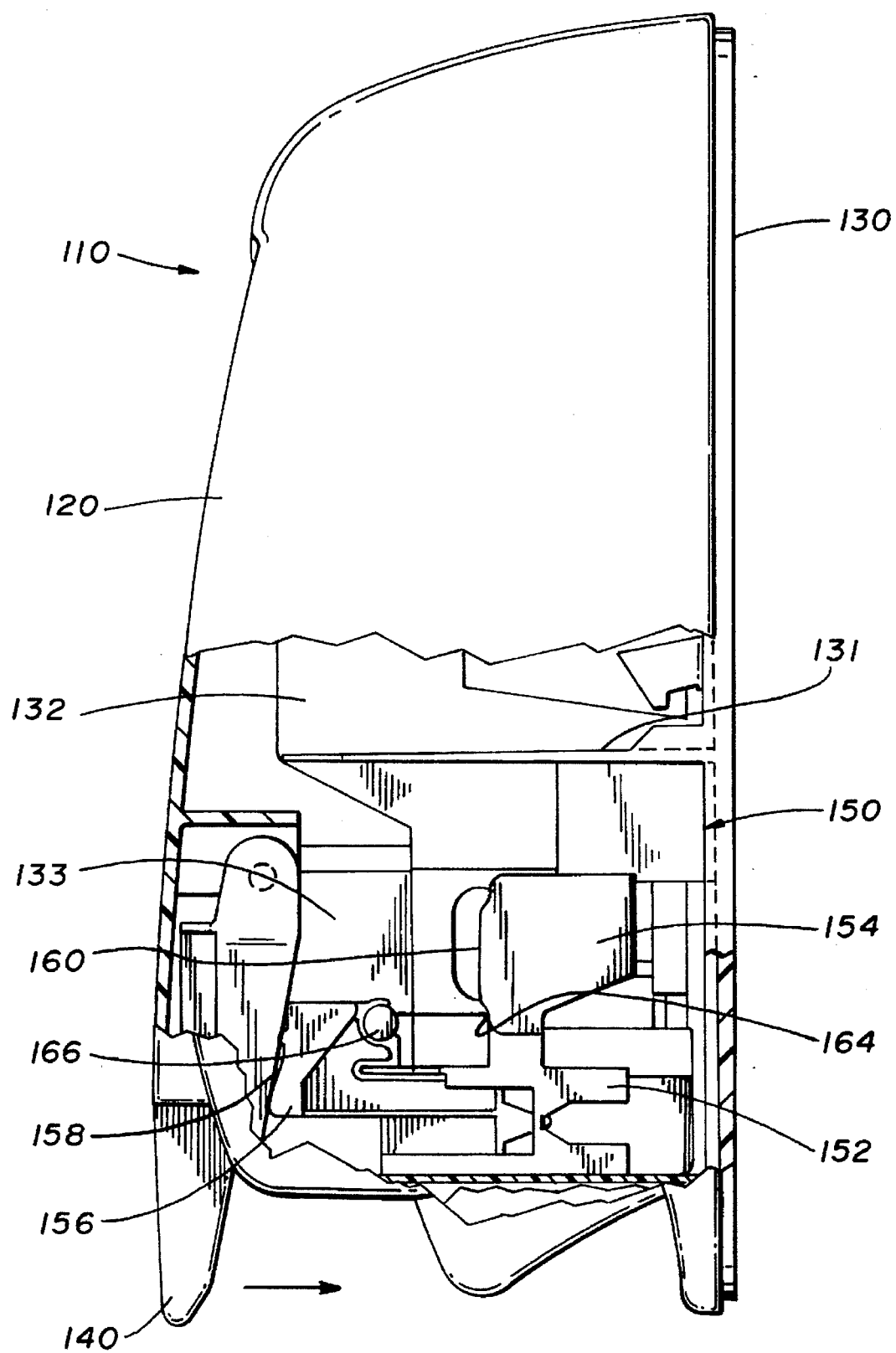
FIG. 2 is a side elevational view of the dispenser of FIG. 1 partially broken away and showing the measuring apparatus in place.

Referring now to FIG. 2, it can be seen that the push bar or pressure bar 140 is capable of moving inwardly or from the left (starting position) to the right (dispensing position) of FIG. 2 of the drawings upon engagement by the hand of the user to engage and collapse tube 133. In the preferred embodiment, the push bar or pressure bar 140 rotates from the starting position to the dispensing position a travel amount of about 21°. It will be understood that no soap is dispensed for about the first 7° of travel as there is not yet any soap in the tube 133. The soap is dispensed as the push bar 40 travels through the remaining 14° of travel. The base or wall mounting plate 130 has a shelf 131 which receives a container of the soap or other fluid being dispensed and is generally indicated by the numeral 132 in FIG. 2. The tube 133 extends downwardly from the container 132 and is engaged by the push bar 140 when it is moved to the right of FIG. 2. This will collapse the tube 133 and eject or trigger a predetermined measure of the soap or other material through a nozzle (not shown) at the bottom end of the tube. Assuming the user has engaged bar 140 with the heel of the hand, the soap will be deposited in the user's palm.

Referring now to FIGS. 2 through 6 of the drawings for a description of the embodiment of an electrical measuring apparatus, it will be seen that the measuring apparatus is generally indicated by the numeral 150 and includes a frame 152 which carries a housing 154 and also includes a subframe 156 which is movable relatively of the main frame 152.

One end of the subframe 156 has a surface 158 which serves as a contact point for engagement with the push bar or pressure bar 140 so that when the bar 140 is depressed to the right of FIG. 2, for example, the surface 158 is engaged by the bar, causing the subframe 156 to slide axially relatively of the main frame 152 toward the base or wall mounting plate 130.

Figure 3:
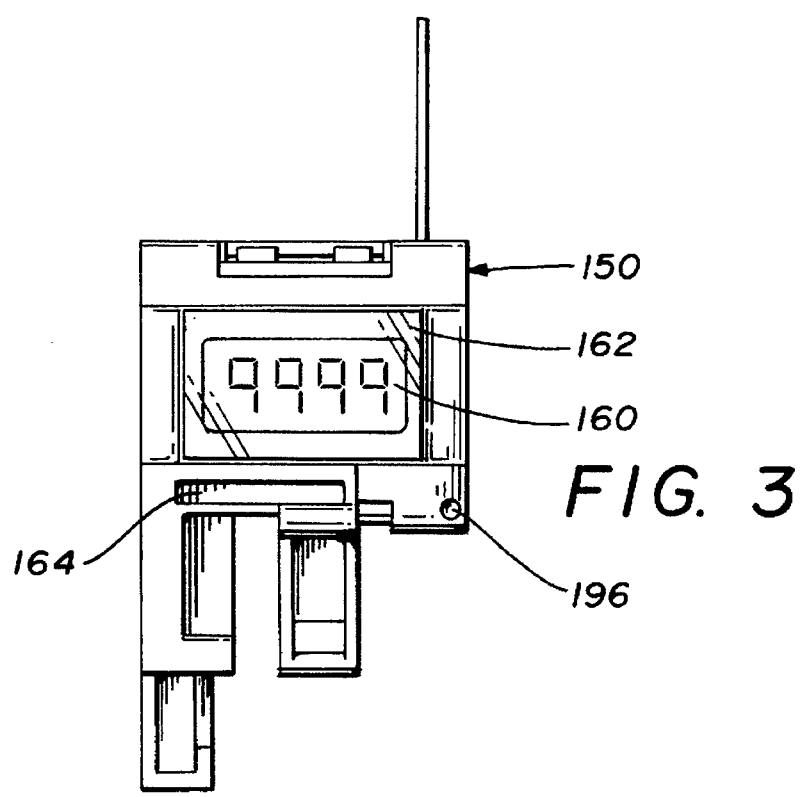
FIG. 3 is a front elevational view of the measuring apparatus.
Figure 4:
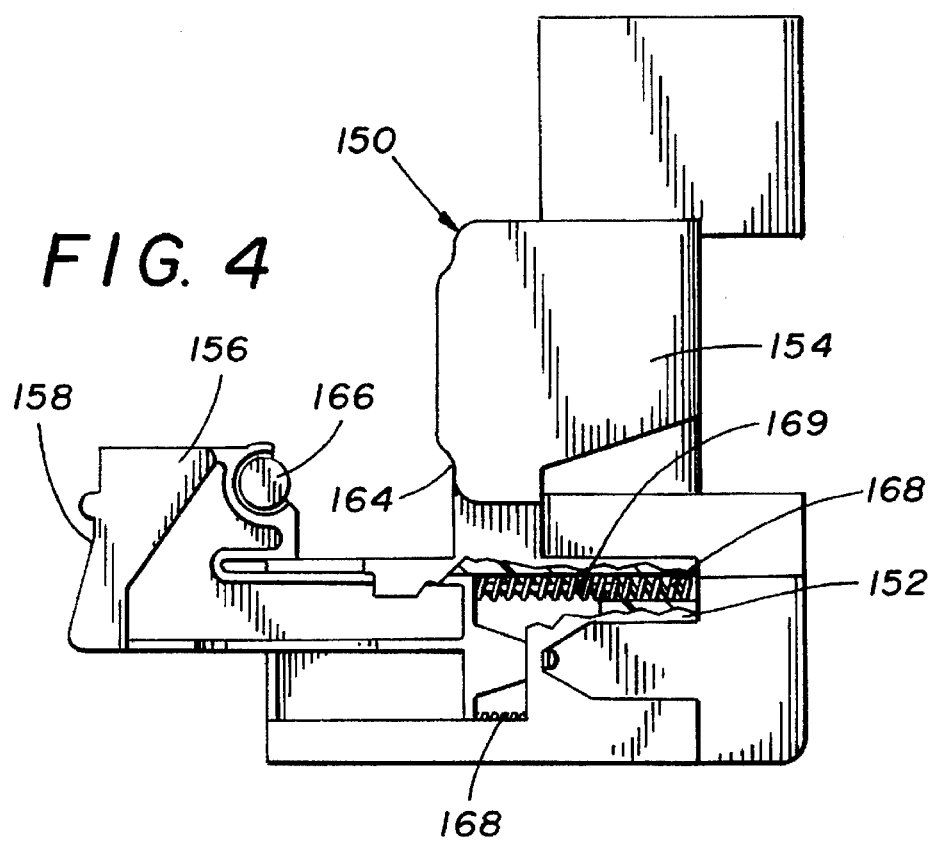
FIG. 4 is a side elevational view, partially in section, of the measuring apparatus in an open position.
Figure 5:
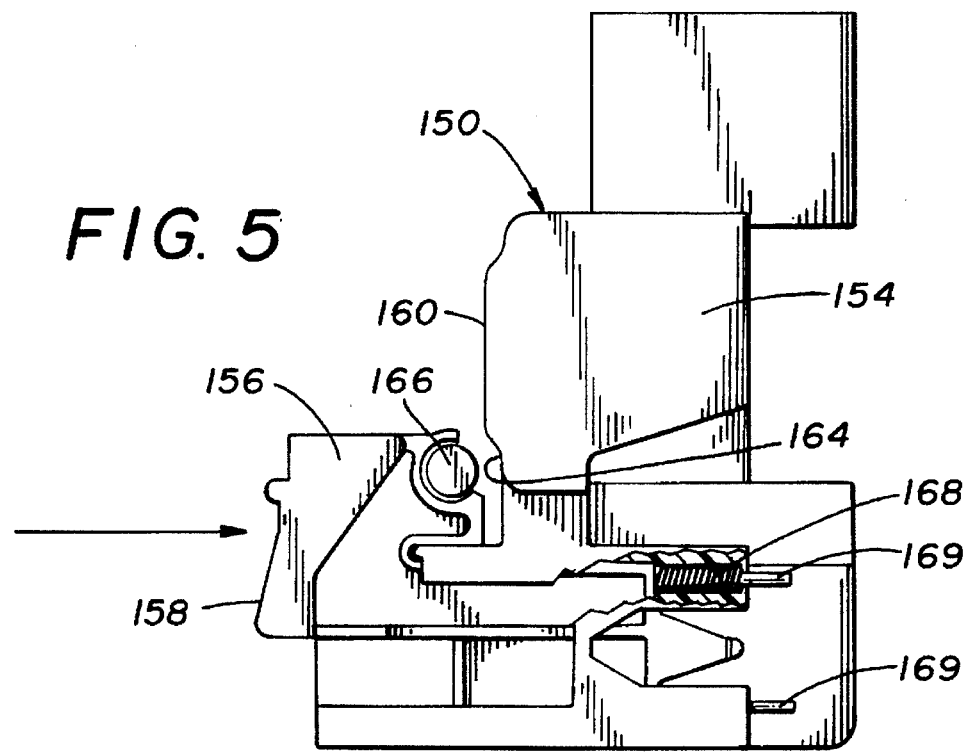
FIG. 5 is a side elevational view, partially in section, of the measuring apparatus in a closed position.

Referring now to FIG. 3 in particular, it can be seen that the measuring apparatus 150 has a numerical display 160 which is covered by a transparent window 162. It will be appreciated that although only a four digit numerical display is shown, it would be in the spirit of the present invention to have a numerical display with more than four digits. The measuring apparatus 150 also has a switch receptacle 164 for receiving a switch actuator 166 which is best shown in FIGS. 4 and 5. Although any number of switch actuation devices could be used for the switch receptacle 164 and the actuator 166, in the preferred embodiment, the switch receptacle 164 is a Reed switch and the actuator 166 is a magnet. In the preferred embodiment, the switch is not effectively closed until the push bar 40 has traveled about 7° from the starting position. As those skilled in the art will appreciate, the switch receptacle 164 and actuator 166 function as a proximity switch.

FIGS. 4 and 5 further illustrate that the subframe 156 has a set of springs 168 received upon guide rods 169 for the purpose of biasing the subframe 156 with respect to the frame 152. Those skilled in the art will appreciate that as the push bar 140 is directed or rotated from left to right in FIG. 2, the subframe surface 158 will also be axially directed in a similar fashion. Therefore, as the switch actuator 166 moves into proximity with the switch receptacle 164, a display circuit 170 contained within the measuring apparatus 150 is enabled in a manner described below.

Referring now to FIG. 6, the display circuit 170, which is carried by the measuring apparatus 150, generally provides a time delay circuit 172, a counter circuit 174, and the numerical display 160. As is well known in the art, a power supply 176, such as a battery, provides the necessary electrical power to the time delay circuit 172 and the counter circuit 174.

In particular, the time delay circuit 172 includes a switch 180 which represents the switch actuator 164 and the switch receptacle 166 discussed above. One end of the switch 180 is connected to ground while the opposite end of the switch 180 is connected to one end of a current limiting resister 182. The opposite end of the current limiting resistor 182 is electrically connected to one end of a time delay resistor 184 and also to one end of a time delay capacitor 186. The opposite end of the time delay resistor 184 is electrically connected to the power supply 176, while the opposite end of the time delay capacitor 186 is electrically connected to ground. Those skilled in the art will appreciate that the time delay resistor 184 and the time delay capacitor 186 form an RC network which provides a time constant dependent upon the resistance and capacitance values of 184, 186, respectively.

At initial power-up, the time delay capacitor 186 is fully charged by power supply 176. Upon closure of the switch 180, the time delay capacitor 186 discharges through the current limiting resistor 182 and a count signal 188 is placed in negative transition. In other words, the count signal 188 goes from a high signal level to a low signal level. It will be appreciated that the current limiting resistor 182 is relatively small in value and is in place to prevent the switch 180 from welding shut. Once the switch 180 is opened, by the release of pressure upon the push bar 140, the capacitor 186 will slowly recharge depending upon the time constant of the RC network 184, 186 and place the count signal 188 in a positive transition, that is, from a low signal level to a high signal level.

The count signal 188, which fluctuates depending upon the status of switch 180, is received by the counter circuit 174 so as to determine when the dispenser 110 has been used. The counter circuit 174 includes a Schmitt trigger 190, a counter 192, and a display driver 194. A typical counter circuit 174 of this general type is the ICM7224 four and a half digit LCD display counter commercially available from the Harris Corporation of Melbourne, Fla. Such a counter circuit 174 is electrically connected to the numerical display 160 for the purpose of visually displaying and recording the number of times the dispenser 110 has been used.

In operation, the push bar or pressure bar 140 is moved to the right of FIG. 2 and contact is made with the surface 158 of subframe 156. This will cause the subframe 156 and the switch activator 166 to move to the right in FIG. 2 and as best illustrated in FIG. 5. This will cause the dispenser 110 to be in a dispensing position while simultaneously causing the switch actuator 166 to be received by the switch receptacle 164. Since the dispenser 110 does not dispense soap until after the push bar 140 passes the first 7° of travel, the actuator or magnet 166 does not toggle the switch receptacle 164 until such time. This proximity triggering of the switch actuator 164 and switch receptacle 166 is represented in FIG. 6 by the closure of the switch 180.

Once the switch 180 is closed, the capacitor 186 discharges and places the count signal 188 in negative transition. The Schmitt trigger 190 receives this negative transition and generates a corresponding signal 191 in negative transition. This negative transition in signal 191 increments the counter 192. When the counter 192 is incremented, a signal 193 is transmitted to the display driver 194 which generates a corresponding visual display signal 195 to the numerical display 160 so as to record an increase in the number of washes or cycles.

It will be understood that when the switch 180 is closed, the counter circuit 174 is indexed to the next highest number. However, once the switch 180 is opened, the counter circuit 174 will not receive any additional negative transitions until the time delay capacitor 186 is allowed to fully recharge through the time delay resistor 184. If during this recharge period the press bar 140 is pressed again to close switch 180, the time delay capacitor 186 will not have the necessary charge accumulated to place the Schmitt trigger 190 at a high level. Moreover, re-closure of switch 180 will dissipate any charge that has accumulated across time delay capacitor 180. Since the signal 191 has not yet returned to a high level, a negative transition cannot be provided to increment the counter 192 until the time delay capacitor 186 is fully recharged. It is only when pressure is released from the push bar 140 for a predetermined period of time, determined by the time constant of the time delay resistor 184 and the time delay capacitor 186, that the count signal 188 can be placed at a high level so that the counter circuit 174 can register a negative transition.

It will be apparent, therefore, that with this arrangement even if the user "pumps" the push bar or pressure bar 140 before releasing it and completing the hand washing that the counter circuit 174 will record only one "wash" since the time constant of the RC network 184, 186 has fully elapsed to allow the Schmitt trigger 190 to provide a corresponding negative transition to the counter 192. Thus, regardless of whether the user keeps his or her hand in contact with the push bar 140 and delivers a number of strokes or removes the hand and reengages the bar, there will not be an additional count increase until the push bar 140 has been released and returned to the starting position for a predetermined period of time. It has been found that the proper period of time delay can range anywhere from two to ten seconds, and that in the preferred embodiment a time delay of three seconds is desirable.

It will be apparent that the predetermined lapse of time involved can be altered, in the form of the embodiment illustrated by simply altering either the resistance value of the time delay resistor 184 or the capacitance value of the time delay capacitor 186. Therefore, periodic review of the reading on the counter will enable one to ascertain the total number of washes in a given period of time.

It will be further appreciated that an optional reset button 196 can be incorporated into the counter 192 so as to provide a reset signal 198. Thus, if desired, the operator of the dispenser 110 can reset the number of cycles in the counter 192 to zero so as to provide a value of zero on the numerical display 160 when the reset button 196 is activated. As seen in FIG. 3, the reset button 196 is carried on the measuring apparatus 150. Of course, the reset button may be located anywhere on the measuring apparatus desired.

Turning now to the flow-chart illustrated in FIG. 7, the sequential operation of the measuring apparatus 150 will be described. At step 210, the display circuit 170 is energized whereupon at step 212 the counter 192 is set to zero. At step 214, the user of the dispenser 110 depresses the push bar 140 to receive a supply of soap and increment the counter 192 at step 216. Simultaneously, at step 218, a timer (RC circuit 184, 186) is started. Next, at step 220, the display circuit 170 monitors the position of the circuit switch 180. If the press bar 140 is depressed before the timer expires or elapses, the timer is reset to zero at step 218 and commences the timing cycle anew when the press bar 140 is released. When the timer does expire at step 222, the flow chart returns to await the commencement of a new wash cycle at step 214. It will be appreciated that at step 224, if desired, the operator may push the reset button 196 and return the value in the counter 192 to zero.

While a full and complete description of the invention has been set forth in accordance with the dictates of the Patent statutes, it should be understood that modifications can be resorted to without departing from the spirit hereof or the scope of the appended claims. For example, the invention has been described in the context of hand washing and soap dispensers associated therewith. However, it is believed apparent that the measuring function could be readily adapted to dispensers which dispense material other than soap, if so desired. Finally, while a RC network 184, 186 has been illustrated and described as the medium for registering a wash on the numerical display 160, it is believed apparent that other timer or time delay means could be employed.

For example, the invention has been described in the context of hand washing and soap dispensers associated therewith. However, it is believed apparent that the measuring function could be readily adapted to dispensers which dispense material other than soap, if so desired.

Furthermore, certain representative patents have been referred to herein to show the general type of dispenser involved. These patents illustrate dispensers which are activated by pushing the bar toward the mounting surface. There are others such as Christine U.S. Pat. No. 4,349,133 and Frassanito U.S. Pat. No. 4,394,938 which are actuated by pulling a similar bar away from the mounting surface, and it is believed that the principle of this invention would have equal utility in that arrangement as well.

What is claimed is:

1. Apparatus for electronically measuring the usage of a fluid dispenser which is actuated by pressure on an activating member which, in turn, triggers the discharge of material from the dispenser upon movement of the activating member from a starting position to a dispensing position, comprising:

a) a counting apparatus carried by the dispenser;
   b) a numerical display electrically connected to said counting apparatus;
   c) a moveable switch actuator operative with a switch receptacle communicative with said counting apparatus;
   d) said counting apparatus counting one cycle of use upon the activating member moving into a dispensing position so as to move said switch activator into a closed position with said switch receptacle and wherein said counting apparatus is precluded from counting an additional cycle of use until a predetermined period of time has elapsed from when said moveable switch activator has returned to an open position.

2. The apparatus of claim 1, wherein said switch receptacle and said counting apparatus has disposed therebetween time delay means; said time delay means having a timer with a predetermined time period, said timer being activated whenever said switch actuator moves into an open position with respect to said switch receptacle.

3. The apparatus of claim 2 wherein said timer is reset whenever said moveable switch actuator is moved into the dispensing position prior to the lapsing of said predetermined time period.

4. The apparatus of claim 3 wherein said timer is a resistor-capacitor network.

5. The apparatus of claim 3 wherein said predetermined time period is between two to ten seconds.

6. The apparatus of claim 5 wherein said predetermined time period is three seconds.

7. The apparatus of claim 3 wherein said counting apparatus is electrically operative with a reset switch such that the number of cycles counted is reset to zero when said reset switch is activated.

8. A method of measuring the number of usages of a liquid dispenser in which a charge of material is ejected upon the movement of an activating member against a dispensing member comprising the steps of:
   a) engaging moveable actuating means by the activating member, said moveable actuating means carrying switch activation means;
   b) providing a counter circuit to receive said switch activation means so as to count a dispensing event and start a timer; and
   c) counting an additional dispensing event only after return of the activating member and said moveable actuating means to their starting position and then after a predetermined lapse of time.

9. The method of claim 8 wherein said timer is reset whenever said switch activation means is moved into the dispensing position prior to the lapsing of said predetermined time period.

10. The method of claim 9 further including the step of displaying visually the number of usages of the liquid dispenser.

11. The method of claim 10 further including the step of resetting, when desired, the number of cycles counted by actuating a reset switch.

12. An improved measuring apparatus for measuring the usage of a fluid dispenser which is actuated by pressure of an activating member which, in turn triggers the discharge of material from the dispenser upon movement of the activating member from a starting position to a dispensing position, so that a counting apparatus does not count additional uses until a predetermined lapse of time has occurred, wherein the improvement comprises:
   a) a numerical display electrically connected to the counting apparatus;
   b) a moveable switch actuator operative with a switch receptacle and communicative with the counting apparatus; and
   c) time delay means interposed between-the counting apparatus and said switch receptacle, said time delay means has a timer with a predetermined time period;
   d) wherein the counting apparatus immediately counts one cycle of use upon the activating member moving into a dispensing position which moves said switch activator into a closed position with said switch receptacle, wherein the counting apparatus is precluded from counting an additional cycle of use until said predetermined time period has fully elapsed, and wherein said predetermined time period commences only when said switch actuator is placed in an open position with respect to said switch receptacle.

13. The improved measuring apparatus of claim 12 wherein said timer is reset whenever said moveable switch actuator is moved into the dispensing position prior to the lapsing of said predetermined time period.

* * * * *